(12) United States Patent
Ling et al.

(10) Patent No.: US 11,893,071 B2
(45) Date of Patent: Feb. 6, 2024

(54) CONTENT RECOMMENDATION METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Cheng Ling, Shenzhen (CN); Yalong Wang, Shenzhen (CN); Rui Wang, Shenzhen (CN); Ruobing Xie, Shenzhen (CN); Feng Xia, Shenzhen (CN); Leyu Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/726,048

(22) Filed: Apr. 21, 2022

(65) Prior Publication Data

US 2022/0245213 A1 Aug. 4, 2022

Related U.S. Application Data

(63) Continuation of application No. PCT/CN2021/074966, filed on Feb. 3, 2021.

(30) Foreign Application Priority Data

Apr. 7, 2020 (CN) .......................... 202010263520.7

(51) Int. Cl.
*G06F 16/00* (2019.01)
*G06F 16/9536* (2019.01)
(Continued)

(52) U.S. Cl.
CPC ...... *G06F 16/9536* (2019.01); *G06F 16/9535* (2019.01); *G06N 3/045* (2023.01); *H04L 67/535* (2022.05)

(58) Field of Classification Search
CPC ............... G06F 16/9535; G06F 16/958; G06F 16/9536; G06F 3/04817; G06F 3/0483;
(Continued)

(56) References Cited

U.S. PATENT DOCUMENTS 8,843,965 B1 9/2014 Kurapati et al.
2008/0120339 A1 5/2008 Guan et al.
(Continued)

FOREIGN PATENT DOCUMENTS

CN 1428044 A 7/2003
CN 101770520 A 7/2010
(Continued)

OTHER PUBLICATIONS

The State Intellectual Property Office of the People's Republic of China (SIPO) Office Action 1 for for 202010263520.7 dated Jun. 1, 2020 11 Pages (including translation).
(Continued)

*Primary Examiner* — Yicun Wu
(74) *Attorney, Agent, or Firm* — ANOVA LAW GROUP PLLC

(57) ABSTRACT

This application provides a content recommendation method and apparatus, an electronic device, and a storage medium. The content recommendation method includes obtaining content feedback information of a target object and content feature information of content that is to be recommended in response to a content recommendation request of the target object, the content feedback information comprising explicit feedback information and implicit feedback information and object portrait information of the target object; performing feature interaction according to the explicit feedback information and the implicit feedback information in the content feedback information, and obtaining behavior preference information; performing feature extraction based on the behavior preference information, the content feedback information, and the content feature information, and obtaining a predicted click-through rate (CTR); and determining, according to the predicted CTR, recommended content from the pieces of content that is to be recommended, and transmitting the recommended content to a terminal device.

17 Claims, 11 Drawing Sheets

(51) Int. Cl.
*G06F 16/9535* (2019.01)
*H04L 67/50* (2022.01)
*G06N 3/045* (2023.01)

(58) Field of Classification Search
CPC .......... G06N 3/08; G06N 3/045; G06N 20/00; G06Q 30/0631
See application file for complete search history.

(56) References Cited

U.S. PATENT DOCUMENTS

| | | | |
|---|---|---|---|
| 2013/0275580 A1 | 10/2013 | Chamiel et al. | |
| 2021/0073858 A1* | 3/2021 | Sokolov | G06Q 30/0255 |
| 2021/0110303 A1 | 4/2021 | Wan | |

FOREIGN PATENT DOCUMENTS

| | | |
|---|---|---|
| CN | 102346899 A | 2/2012 |
| CN | 102387207 A | 3/2012 |
| CN | 105160548 A | 12/2015 |
| CN | 108416625 A | 8/2018 |
| CN | 109862432 A | 6/2019 |
| CN | 110704753 A | 1/2020 |
| CN | 110851706 A | 2/2020 |
| CN | 110929206 A | 3/2020 |
| CN | 111177575 A | 5/2020 |

OTHER PUBLICATIONS

The World Intellectual Property Organization (WIPO) International Search Report for PCT/CN2021/074966 dated Apr. 30, 2021 7 Pages (including translation).

* cited by examiner

Respectively input a click history sequence, an unclick history sequence, and an explicit feedback history sequence corresponding to the target object into a deep feedback interaction component, and perform encoding and decoding processing on the click history sequence, the unclick history sequence, and the explicit feedback history sequence based on a transformer based on a self-attention mechanism in the deep feedback interaction component to obtain a corresponding click high-order vector, a corresponding unclick high-order vector, and a corresponding explicit feedback high-order vector ⸺ S222

Perform feature interaction on the click high-order vector and the unclick history sequence by using an attention mechanism, to obtain a first interaction vector corresponding to the target object, and perform feature interaction on the explicit feedback high-order vector and the unclick history sequence to obtain a second interaction vector corresponding to the target object ⸺ S223

Concatenate the click high-order vector, the unclick high-order vector, the explicit feedback high-order vector, the first interaction vector, and the second interaction vector to obtain a behavior preference feature vector of the target object, and use the behavior preference feature vector as the behavior preference information of the target object ⸺ S224

FIG. 2D

Learn weight contributions of different feature fields in the object portrait information and the content feature information based on a wide component, and obtain a feature weight vector; perform feature extraction on the behavior preference feature vector and dense feature vectors based on a factorization machine (FM) component, and obtain a low-order interaction feature vector corresponding to the target object; and perform feature extraction on the behavior preference feature vector and the dense feature vectors based on the deep neural networks (DNN) component, and obtain a high-order interaction feature vector corresponding to the target object ⸺ S221

Concatenate the feature weight vector, the low-order interaction feature vector, and the high-order interaction feature vector to a fully-connected layer, and determine the predicted CTR at which the target object clicks the content through weighted summation ⸺ S231

FIG. 2E

CONTENT RECOMMENDATION METHOD AND APPARATUS, ELECTRONIC DEVICE, AND STORAGE MEDIUM

RELATED APPLICATIONS

This application is a continuation of PCT Application No. PCT/CN2021/074966 filed on Feb. 3, 2021, which in turn claims priority to Chinese Patent Application No. 202010263520.7, entitled "CONTENT RECOMMENDATION METHOD AND APPARATUS, ELECTRONIC DEVICE, AND STORAGE MEDIUM" filed with the China National Intellectual Property Administration on Apr. 7, 2020. The two applications are both incorporated herein by reference in their entirety.

FIELD OF THE TECHNOLOGY

This application relates to the field of computer technologies, and in particular, to the field of machine learning, and provides a content recommendation method and apparatus, an electronic device, and a storage medium.

BACKGROUND OF THE DISCLOSURE

The rise of the Internet allows people to view different web content while browsing the same page, thereby achieving the personalized display of the web content. Tests performed based on click-through rates (CTRs) can help learn about web content that different users are interested in, so that the corresponding web content is displayed to each user more accurately, thereby increasing the CTR of the web content, improving the web content delivery effect, and increasing the numbers of page views.

The CTR prediction of the web content refers to every time a user requests a page, the background system uses a preset prediction model to predict a CTR of each page that the user clicks on, and then recommends web content to the user based on the CTRs.

SUMMARY

Embodiments of this application provide a content recommendation method, performed by an electronic device, the method including obtaining content feedback information of a target object and content feature information of content that is to be recommended in response to a content recommendation request of the target object, the content feedback information comprising at least explicit feedback information and implicit feedback information of the target object on recommended content and object portrait information of the target object; performing feature interaction according to the explicit feedback information and the implicit feedback information in the content feedback information, and obtaining behavior preference information of the target object; performing feature extraction based on the behavior preference information, the content feedback information, and the content feature information, and obtaining a predicted click-through rate (CTR); and determining, according to the predicted CTR, recommended content from the pieces of content that is to be recommended, and transmitting the recommended content to a terminal device corresponding to the target object.

Embodiments of this application provide a content recommendation apparatus, the content recommendation apparatus including an information obtaining unit, configured to obtain content feedback information of a target object and content feature information of content that is to be recommended in response to a content recommendation request of the target object, the content feedback information comprising at least explicit feedback information and implicit feedback information of the target object on recommended content and object portrait information of the target object; a first feature extraction unit, configured to perform feature interaction according to the explicit feedback information and the implicit feedback information in the content feedback information, and obtain behavior preference information of the target object; a second feature extraction unit, configured to perform feature extraction based on the behavior preference information, the content feedback information, and the content feature information, and obtain a predicted click-through rate (CTR); and a prediction unit, configured to determine, according to the predicted CTR at which the target object clicks each piece of content that is to be recommended, recommended content for the target object from the pieces of content that is to be recommended, and transmit the determined recommended content to a terminal device corresponding to the target object.

The embodiments of this application provide an electronic device, including a processor and a memory, the memory storing program code, the program code, when executed by the processor, causing the processor to perform steps of any one of the foregoing content recommendation methods.

Embodiments of this application provide a non-transitory computer-readable storage medium, including program code, when the program code runs on an electronic device, the program code causing the electronic device to perform: obtaining content feedback information of a target object and content feature information of content that is to be recommended in response to a content recommendation request of the target object, the content feedback information comprising at least explicit feedback information and implicit feedback information of the target object on recommended content and object portrait information of the target object; performing feature interaction according to the explicit feedback information and the implicit feedback information in the content feedback information, and obtaining behavior preference information of the target object; performing feature extraction based on the behavior preference information, the content feedback information, and the content feature information, and obtaining a predicted click-through rate (CTR); and determining, according to the predicted CTR, recommended content from the pieces of content that is to be recommended, and transmitting the recommended content to a terminal device corresponding to the target object.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings:

FIG. 2D is a specific flowchart of obtaining behavior preference information of a target object based on deep feedback interaction according to some embodiments of this application.

FIG. 2E is a flowchart of a specific process of performing feature extraction based on behavior preference information, content feedback information, and content feature information, and obtaining a predicted CTR at which the target object clicks content that is to be recommended according to some embodiments of this application.

DESCRIPTION OF EMBODIMENTS

Figure 1:
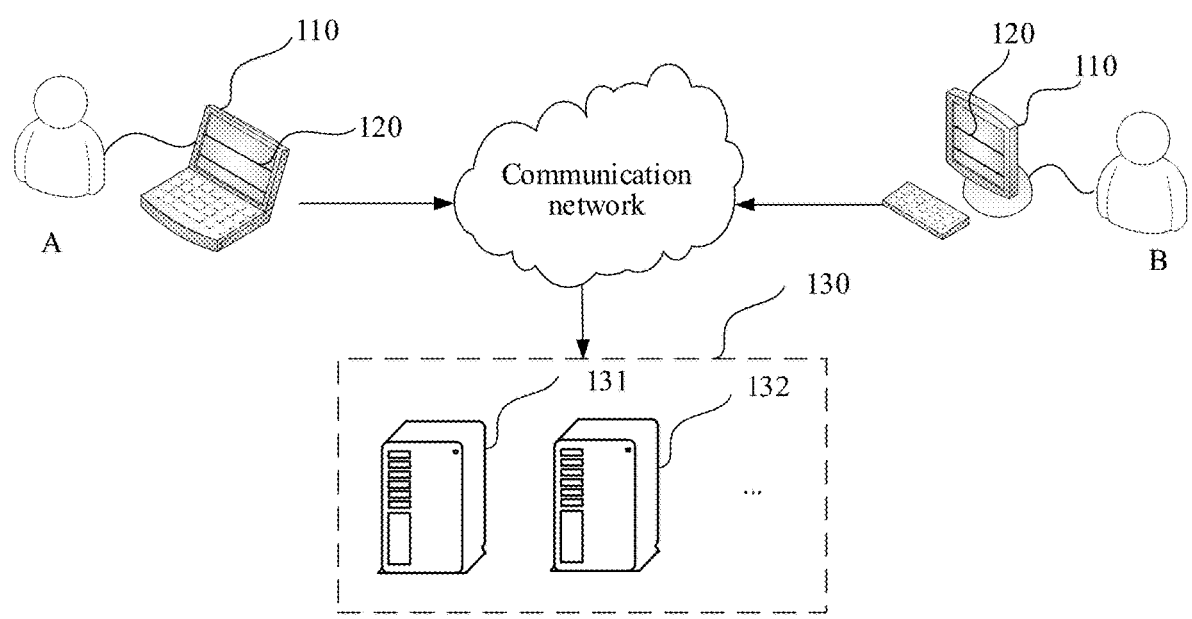
FIG. 1 is a schematic diagram of an application scenario according to some embodiments of this application.

To make the objectives, technical solutions, and advantages of the embodiments of this application clearer, the technical solutions in this application will be clearly and completely described in the following with reference to the accompanying drawings in the embodiments of this application. Apparently, the described embodiments are merely a part rather than all of the embodiments of the technical solutions of this application. All other embodiments obtained by a person of ordinary skill in the art based on the embodiments recorded in the document of this application without creative efforts shall fall within the protection scope of the technical solutions of this application.

The following describes some concepts involved in the embodiments of this application.

Content is a collective term for all the information posted on the Internet that can be viewed and read, and may also be referred to as web content, such as videos, news, e-books, web articles, information, and forum posts, or may further refer to merchandise. The content in the embodiments of this application is mainly classified into content that is to be recommended and recommended content. The content that is to be recommended refers web content that is to be recommended to a target object, and web content to be recommended to the target object is selected from a plurality of pieces of content that is to be recommended according to predicted CTRs. The recommended content is web content that has been recommended to the target object, and therefore, the recommended content corresponds to target object behavior feedback.

Content feature information is information used for describing content attributes. In the embodiments of this application, the content feature information may also be referred to as content portrait. Using an article as an example of the content that is to be recommended, information used for describing attributes such as the title (word segmentation), category, author, and article identity (ID) is content feature information.

In the recommendation system, there are interactive behaviors in different forms between the target object and the system, and content feedback information is feedback information determined according to an interactive behavior of the target object on the recommended content. The modes of such interactive behaviors may be classified into explicit feedback and implicit feedback. In the embodiments of this application, an explicit feedback behavior refers to a behavior through which the target object clearly expresses preference for the recommended content, for example, the target object grades or rates the recommended content, or likes or dislikes the recommended content. An implicit feedback behavior refers to a behavior that does not clearly reflect the preference of the target object and comes from indirect expressions of the target object, such as browse, click, or non-click. Correspondingly, feedback information may be also classified into explicit feedback information and implicit feedback information. In addition, the content feedback information in the embodiments of this application may further include object portrait related information, for example, information used for describing attributes such as age, gender, occupation, and hobbies of the target object.

Behavior preference information is information used for describing the preference of the target object for web content, that is, which content the target object likes, which content the target object does not like, or the like. In the embodiments of this application, the behavior preference information of the target object is determined with reference to the explicit feedback information and the implicit feedback information of the target object, and may be represented in the form of a feature vector.

A feed stream refers to an information stream that is continuously updated and presents content to the target object. Feed stream recommendation refers to a content recommendation method of aggregated information. Through the feed stream, dynamic and real-time information can be transmitted to subscribers, which is an effective way for the target object to obtain the information stream. In the embodiments of this application, content may be recommended to the target object in the manner of feed stream recommendation.

In the recommendation system, recalled sub content sets are generally ranked according to CTRs, and the content is then distributed with reference to strategies. In the embodiments of this application, a predicted CTR is a CTR that is predicted according to the preference of the target object and at which the target object clicks the content that is to be recommended. Therefore, recalled sub content sets formed by the content that is to be recommended can be ranked according to predicted CTRs, and personalized recommendation is performed for the target object according to a ranking result.

A click history sequence refers to a sequence formed by content feature information of recommended content determined according to click behaviors of a user on the recommended content. For example, if in 10 pieces of recommended content with IDs 1 to 10, the IDs of the content clicked by the user are respectively 1, 3, 5, 7, and 9, content feature information of the five pieces of content is arranged in a random order or chronological order to form a click history sequence.

An unclick history sequence refers to a sequence formed by content feature information of recommended content determined according to no-click behaviors of a user on the recommended content. For example, if in 10 pieces of recommended content with IDs 1 to 10, the IDs of the content unclicked by the user are respectively 2, 4, 6, 8, and 10, content feature information of the five pieces of content is arranged in a random order or chronological order to form an unclick history sequence.

An explicit feedback history sequence refers to a sequence formed by content feature information of recommended content determined according to explicit feedback behaviors of a user on the recommended content. Using liking as an example, if in 10 pieces of recommended content with IDs 1 to 10, the IDs of the content liked by the user are respectively 1, 3, and 5, content feature information of the three pieces of content is arranged in a random order or chronological order to form an explicit feedback history sequence.

The Hadamard product of a m*n matrix $A=[a_{ij}]$ and a m*n matrix $B=[b_{ij}]$ is recorded as $A*B$. The corresponding element is defined as a m*n matrix with a product $(A*B)_{ij}=a_{ij}b_{ij}$ of elements corresponding to the two matrices. For example:

$$\begin{bmatrix} 1 & 3 & 2 \\ 1 & 0 & 0 \\ 1 & 2 & 2 \end{bmatrix} * \begin{bmatrix} 0 & 0 & 2 \\ 7 & 5 & 0 \\ 2 & 1 & 1 \end{bmatrix} = \begin{bmatrix} 1\cdot 0 & 3\cdot 0 & 2\cdot 2 \\ 1\cdot 7 & 0\cdot 5 & 0\cdot 0 \\ 1\cdot 2 & 2\cdot 1 & 2\cdot 1 \end{bmatrix} = \begin{bmatrix} 0 & 0 & 4 \\ 7 & 0 & 0 \\ 2 & 2 & 2 \end{bmatrix}$$

Attention mechanism is a mechanism that imitates an internal process of a biological observation behavior, that is, a mechanism that aligns internal experience and external sensation to increase the precision of observation in some regions. Simply put, the attention mechanism quickly selects high-value information from a large amount of information. The attention mechanism has two main aspects: deciding which part of an input needs to be paid attention to; and allocating the limited information processing resources to the important part. In a neural network, based on the attention mechanism, the neural network can focus on a subset of inputs (or features) and select a specific input.

Transformer is a transformation model based on the self-attention mechanism in natural language processing, which can implement deep interaction of features in the recommendation field and learn high-order expressions of features.

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology of computer science, which attempts to understand essence of intelligence and produces a new intelligent machine that can respond in a manner similar to human intelligence. AI is to study the design principles and implementation methods of various intelligent machines, to enable the machines to have the functions of perception, reasoning, and decision-making.

The AI technology is a comprehensive discipline, covering a wide range of fields including both a hardware-level technology and a software-level technology. Basic AI technologies generally include technologies such as sensors, dedicated AI chips, cloud computing, distributed storage, big data processing technologies, operating/interaction systems, and mechatronics. AI software technologies mainly include several major directions such as a computer vision technology, a speech processing technology, a natural language processing technology, and machine learning/deep learning (DL).

ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior, and obtaining new knowledge or skills, and reorganize an existing knowledge structure, so as to keep improving its performance. ML is the core of AI, is a basic way to make the computer intelligent, and is applied to various fields of AI. ML and DL generally include technologies such as an artificial neural network, a belief network, reinforcement learning, transfer learning, inductive learning, and learning from demonstrations.

The content recommendation method provided in the embodiments of this application may be divided into two parts, including a training part and an application part. The training part relates to the field of the ML technology. In the training part, a prediction model is trained using the ML technology, so that after content feedback information of a sample object and content feature information of sample content in a training sample are inputted into the prediction model, a predicted CTR at which the sample object clicks the sample content is obtained, and a parameter of the model is continuously adjusted using an optimization algorithm, to obtain a trained prediction model. The application part is used for obtaining, using the prediction model trained in the training part, a predicted CTR at which the target object clicks each piece of content that is to be recommended, and further recommending content to the target object according to predicted CTRs respectively corresponding to the content that is to be recommended.

The following briefly describes the design concept of the embodiments of this application:

In the related art, features inputted into the CTR prediction model are relatively undiversified, and analysis is mainly performed based on a user portrait and a content portrait feature, which does not include a behavior feature of a user. As a result, there is a specific deviation between the analyzed user behavior preference and the true preference and interest of the user. In addition, a CTR predicted based on the CTR prediction model also has a specific difference, resulting in relatively low accuracy of content recommendation and it is difficult to meet personalized requirements of the user.

In view of this, the embodiments of this application provide a content recommendation method and apparatus, an electronic device, and a storage medium. From the perspective of user feedback, in the embodiments of this application, behavior interaction manners between a user and the recommendation system are classified into explicit feedbacks and implicit feedbacks instead of being limited to click and non-click behaviors. Based on the above, a prediction model is provided. The model can well integrate various forms of user behavior feedbacks. In addition to two behaviors of clicking recommended content and not clicking recommended content, the user behavior feedbacks mainly further include behaviors such as sharing and grading the recommended content, and implicit feedback information and explicit feedback information of the user can be determined based on the plurality of forms of user behaviors. User interests can be better captured with reference to such feedback information, thereby improving user experience. Specifically, the prediction model in the embodiments of this application mainly includes a deep feedback interaction component, a wide component, an FM component, and a DNN component. The deep feedback interaction component is mainly used for performing feature interaction on content feedback information of the user, to obtain behavior preference information of the user and effectively capture the current interests of the user. After the behavior preference information is determined based on the foregoing part, feature extraction is performed on the behavior preference information, content feedback information, and content feature information, and a predicted CTR is finally obtained. The CTR obtained based on the content recommendation method in the embodiments of this application is more accurate. Therefore, when content is recommended to the user based on the predicted CTR obtained using the content recommendation method, the recommended content is more in line with the user preference, thereby improving the accuracy and the CTR of the recommended content, and improving user experience.

Moreover, in the embodiments of this application, when feature interaction is performed on the feedback information based on the deep feedback interaction component, time information is further considered. The time information is respectively fused with historical behavior sequences of the user, so that the user behavior preference learned based on the time information is more in line with living habits of the user and is more authentic and reliable.

The following describes the exemplary embodiments of this application with reference to the accompanying drawings of this specification. The exemplary embodiments described herein are merely used for illustrating and explaining this application, but are not intended to limit this application. In addition, the embodiments of this application and features in the embodiments may be mutually combined in a case of no conflict.

FIG. 1 is a schematic diagram of an application scenario according to an embodiment of this application. The application scenario includes two terminal devices 110 and one server 130. An interface 120 related to content recommendation may be logged in to using the terminal device 110. The terminal device 110 may communicate with the server 130 using a communication network.

In some embodiments, the communication network is a wired network or a wireless network.

In this embodiment of this application, the terminal device 110 is an electronic device used by a user. The electronic device may be a computer device that has computing capability and runs instant messaging software and websites or social software and websites, such as a personal computer, a mobile phone, a tablet computer, a notebook computer, or an e-book reader. Each of the terminal devices 110 is connected to the server 130 using a wireless network. The server 130 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this application.

In some embodiments, the server 130 may include a server for implementing a CTR prediction platform 131. In some embodiments, the server 130 may further include a server for implementing a web content management platform 132.

The CTR prediction platform 131 is used for determining at least one piece of web content recommended for the user from a plurality of pieces of content that is to be recommended posted by a network object.

In some embodiments, the web content management platform 132 stores user behaviors corresponding to the plurality of pieces of content that is to be recommended posted by the network object. The user behaviors corresponding to the content may be liking, replying, sharing, grading, and quoting of the content by the user, and other user behaviors.

In some embodiments, the web content management platform 132 is further used for maintaining and pushing web content to the terminal device 110. The web content includes, but is not limited to, e-books, web articles, news, information, videos, forum posts, and the like. The specific form of the web content is not limited in this embodiment of this application.

The two terminal devices are merely used as examples for descriptions, and in this embodiment of this application, a plurality of terminal devices may actually be involved. In addition, servers of the CTR prediction platform 131 and the web content management platform 132 may be independent from each other. Alternatively, the CTR prediction platform 131 and the web content management platform 132 may be implemented in the same server. When the foregoing two platforms are implemented in two servers, the two servers are connected to each other through a communication network.

Figure 2A:
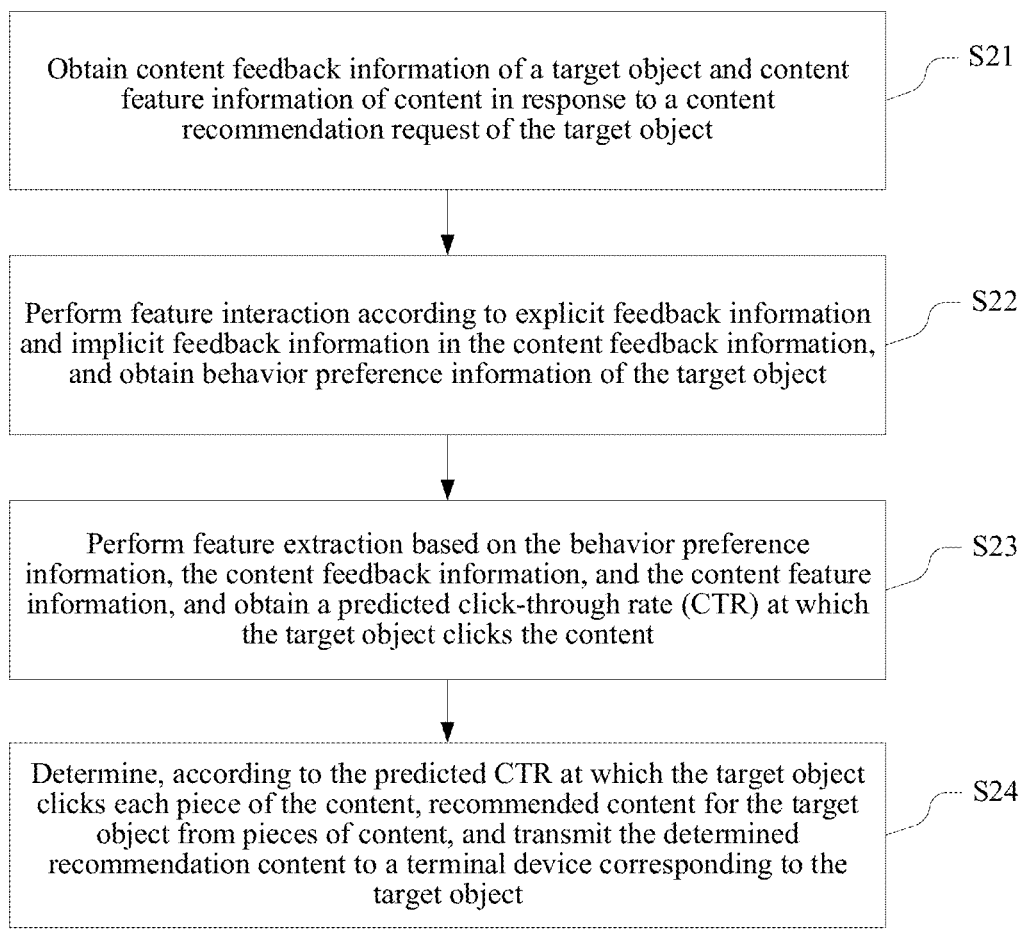
FIG. 2A is a schematic flowchart of a content recommendation method according to some embodiments of this application.

FIG. 2A is an implementation flowchart of a content recommendation method according to an embodiment of this application. The method is performed by an electronic device, and the electronic device may be the server 130 shown in FIG. 1. A specific implementation process is as follows:

S21: Obtain content feedback information of a target object and content feature information of content that is to be recommended in response to a content recommendation request of the target object.

In this embodiment of this application, the target object may be a user, an account used by the user, or the like. Descriptions are made in detail below using a user as an example of the target object.

The content feedback information includes at least explicit feedback information and implicit feedback information of the target object on recommended content and object portrait information of the target object.

Figure 3:
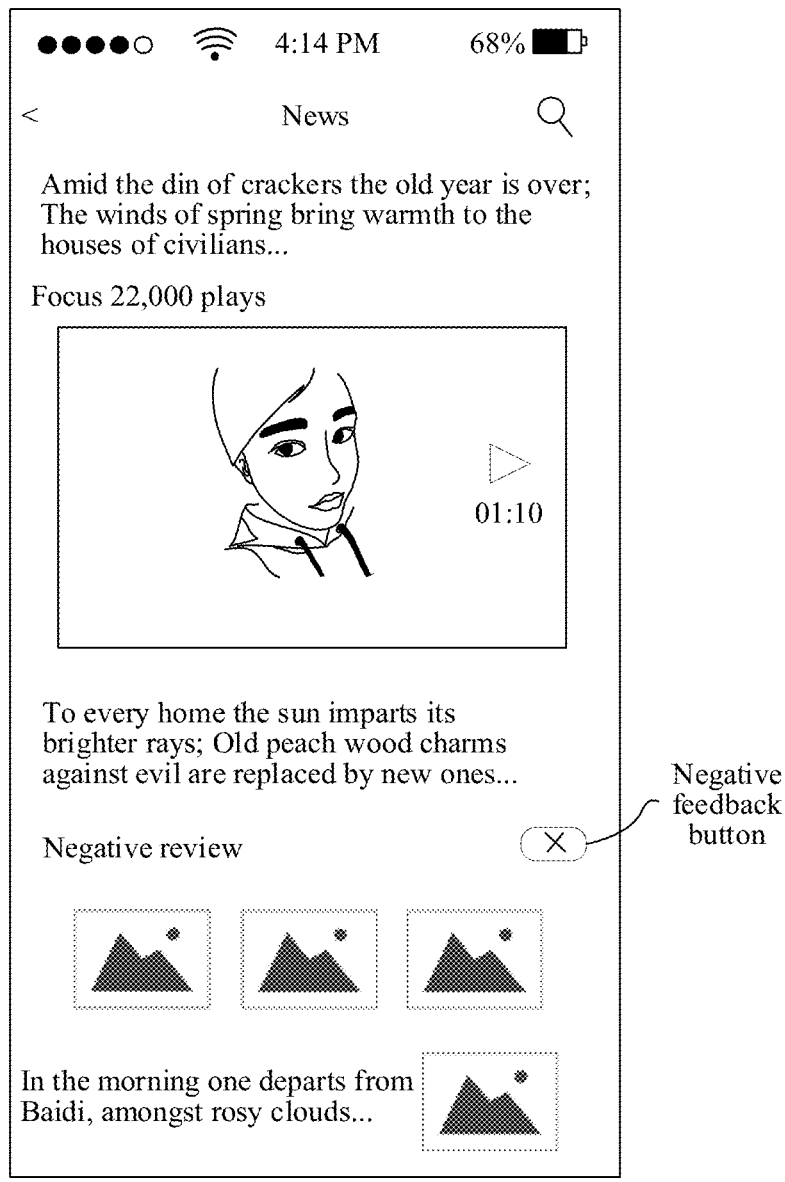
FIG. 3 is a schematic diagram of a content recommendation interface according to some embodiments of this application.

In this embodiment of this application, the explicit feedback information is information determined according to an explicit feedback behavior of the user on the recommended content, including one or more types of explicit negative feedback information and explicit positive feedback information. The explicit negative feedback information may be content feature information of recommended content to which the user clearly expresses the preference with the help of an explicit negative feedback button, for example, a negative feedback button shown in FIG. 3. A behavior that the user closes the negative feedback button may clearly reflect an attitude that the user does not like or is not interested in the news.

Figure 4:
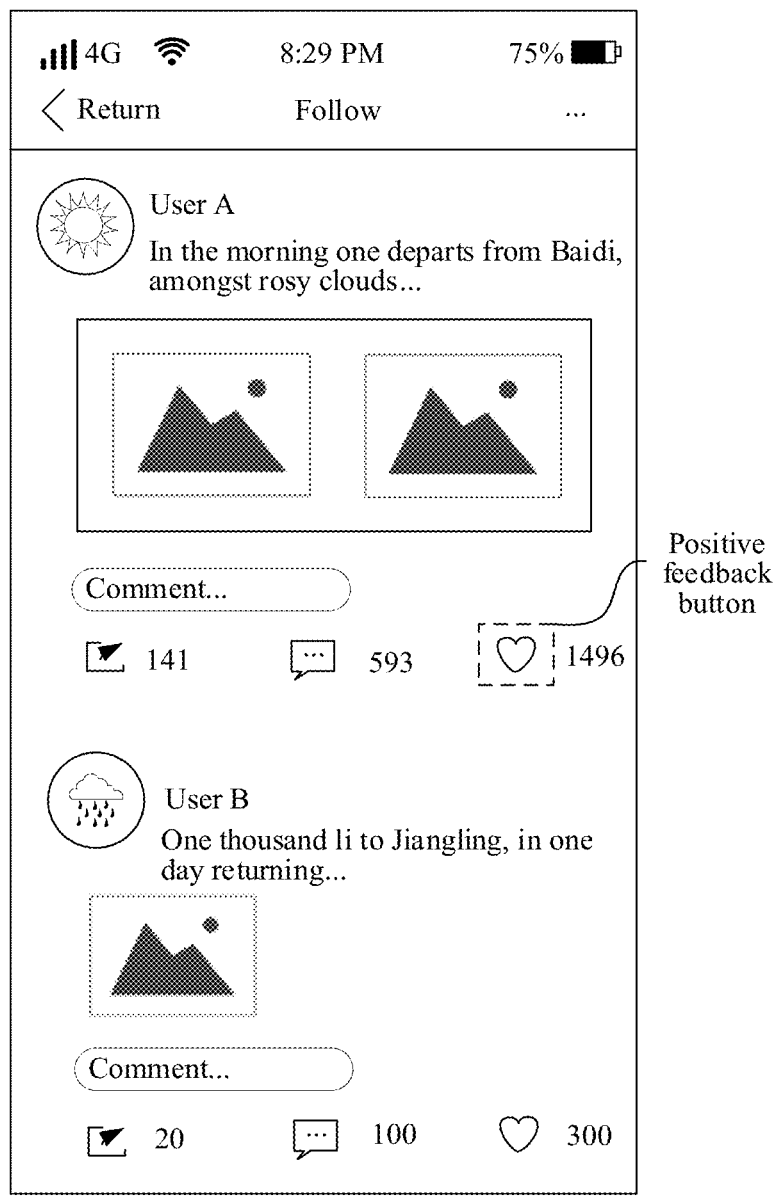
FIG. 4 is a schematic diagram of another content recommendation interface according to some embodiments of this application.

The explicit positive feedback information may be content feature information of recommended content to which the user clearly expresses the preference with the help of a positive feedback button, for example, a positive feedback button shown in FIG. 4. The button is configured to perform a like behavior. A behavior that the user likes a specific post may clearly reflect an attitude that the user likes or is interested in the post.

In some embodiments, the content feedback information of the target object further includes an object portrait. The object portrait may also be referred to as a user portrait, and the user portrait includes at least one feature field, such as a gender field, an age field, an occupation field, a hobby field (for example, favorite games are game A and game B), or the like.

The content feature information of the content that is to be recommended is a content portrait of the content that is to be recommended. Similarly, the content portrait also includes at least one feature field. Using an article as an example of the content that is to be recommended, the feature field included in the content portrait may be: an article title (or text title segmentation) field, an ID field, an author field (for example, from which official account), a category field (for example, sports, education, finance), or the like.

S22: Perform feature interaction according to the explicit feedback information and the implicit feedback information in the content feedback information, and obtain behavior preference information of the target object.

S23: Perform feature extraction based on the behavior preference information, the content feedback information, and the content feature information, and obtain a predicted CTR at which the target object clicks the content that is to be recommended.

Figure 2B:
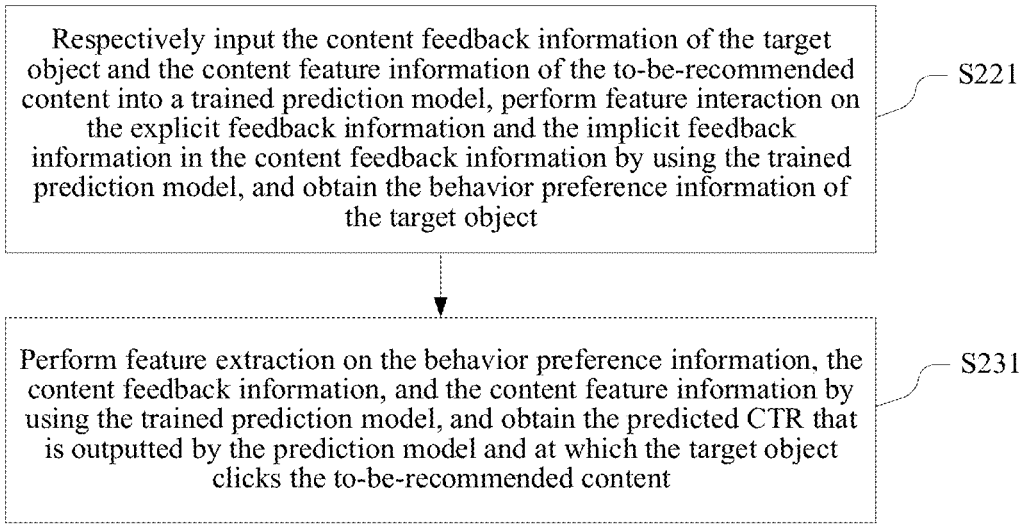
FIG. 2B is a flowchart of specific steps of obtaining a predicted CTR at which a target object clicks content that is to be recommended according to some embodiments of this application.

In some embodiments, obtaining, according to the content feedback information of the target object and the content feature information of the content that is to be recommended, the predicted CTR at which the target object clicks the content that is to be recommended may be implemented using a machine learning model. FIG. 2B shows specific steps of obtaining the predicted CTR at which the target object clicks the content that is to be recommended. As shown in FIG. 2B, a specific process is as follows:

Step S221: Respectively input the content feedback information of the target object and the content feature information of the content that is to be recommended into a trained prediction model, perform feature interaction on the explicit feedback information and the implicit feedback information in the content feedback information using the trained prediction model, and obtain the behavior preference information of the target object.

Step S231: Perform feature extraction on the behavior preference information, the content feedback information, and the content feature information using the trained prediction model, and obtain the predicted CTR that is outputted by the prediction model and at which the target object clicks the content that is to be recommended.

The trained prediction model is trained according to a training sample data set labeled with predicted CTRs, and a training sample in the training sample data set includes content feedback information of a sample object and content feature information of sample content.

In this embodiment of this application, the predicted CTR labeled in the training sample is determined according to a user behavior. If the user clicks the sample content, the labeled predicted CTR is 1, and if the user does not click the sample content, the labeled predicted CTR is 0. The labeled predicted CTRs are labels of training samples. Based on the labels, the training samples may be classified into positive samples or negative samples, and the prediction model can be trained according to the training samples.

The training sample data set includes a plurality of training samples, and each training sample is generated based on a feedback behavior of a sample object to sample content, including content feedback information of the sample object and content feature information of the sample content.

For example, when a user A views short videos on short video software A, for one of the short videos, the user A may generate a feedback behavior such as clicking or not clicking, or liking or not liking the short video, and the user A or an account that the user A currently logs in is a sample object, and the short video currently viewed by the user A is sample content. Therefore, the content feedback information of the sample object includes the age, gender, or other user portraits of the user A, explicit feedback information and implicit feedback information corresponding to the user A, and the like. The content feature information of the sample content is attribute information of the short video, specifically including the author, category, or the like of the short video.

Specifically, the content feedback information of the sample object or the content feature information of the sample content may be obtained through feature services that are provided in the terminal device and related to the user portrait and the content portrait.

The behavior preference information of the target object is extracted based on feature interaction on the explicit feedback information and implicit feedback information of the target object, may be used for describing feedback information of the behavior preference of the target object, and may be specifically obtained by analyzing historical behaviors of the target object.

In this embodiment of this application, when determining, using the prediction model, the predicted CTR at which the target object clicks the content that is to be recommended, first, feature interaction needs to be performed on the explicit feedback information and the implicit feedback information in the content feedback information using the model, to obtain the behavior preference information of the target object. Next, the predicted CTR at which the target object clicks the content that is to be recommended is obtained with reference to the behavior preference information and the content feedback information of the target object, and the content feature information of the content that is to be recommended using the model.

The predicted CTR outputted by the prediction model may be a probability value ranging from 0 to 1. A larger value corresponding to the content that is to be recommended indicates a higher possibility that the target object clicks the content that is to be recommended after the content that is to be recommended is recommended to the target object.

Figure 2C:
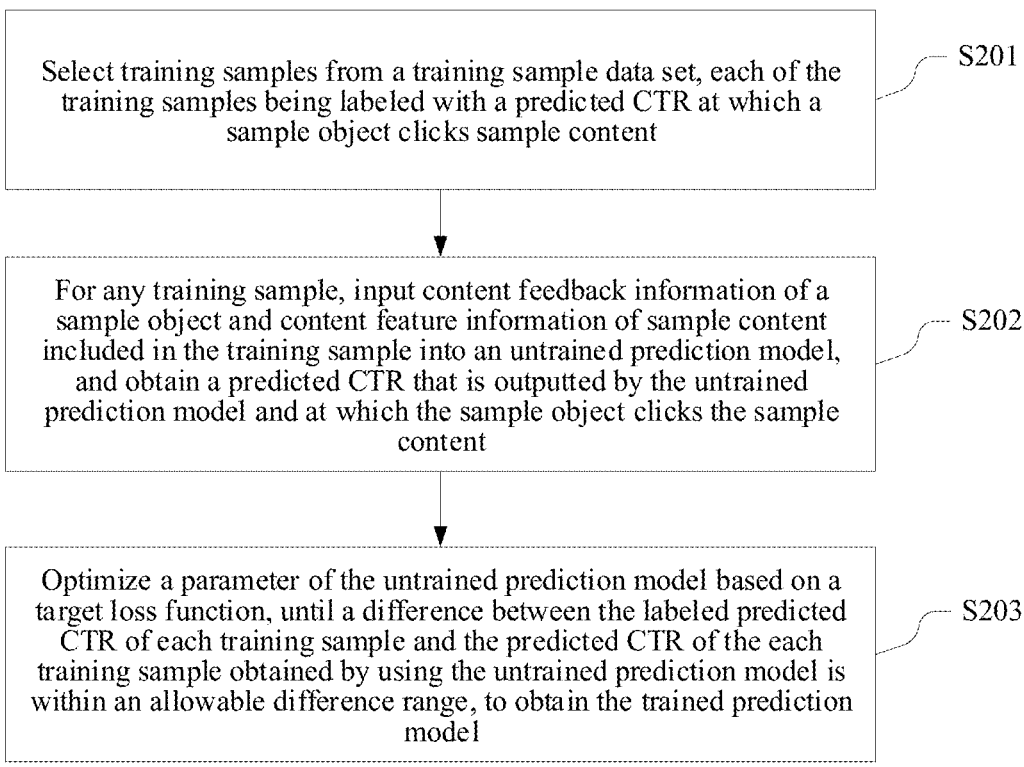
FIG. 2C is a flowchart of a method for training a prediction model according to some embodiments of this application.

In some embodiments, FIG. 2C shows a method for training the prediction model. As shown in FIG. 2C, the trained prediction model is trained through the following steps:

Step S201: Select training samples from the training sample data set, each of the training samples being labeled with a predicted CTR at which a sample object clicks sample content.

Step S202: For any training sample, input content feedback information of a sample object and content feature information of sample content included in the training sample into an untrained prediction model, and obtain a predicted CTR that is outputted by the untrained prediction model and at which the sample object clicks the sample content.

Step S203: Optimize a parameter of the untrained prediction model based on a target loss function, until a difference between the labeled predicted CTR of each training sample and the predicted CTR of each training sample obtained using the untrained prediction model is within an allowable difference range, to obtain the trained prediction model.

In this embodiment of this application, when optimizing the prediction model based on the target loss function, the target loss function is mainly optimized through an optimization algorithm. The prediction model is trained for at least one stage using the target loss function, until the model converges, thereby obtaining the best model.

The optimization algorithm may be a gradient descent algorithm, a genetic algorithm, a Newton algorithm, a quasi-Newton algorithm, or the like.

In some embodiments, the target loss function includes an explicit feedback loss term and an implicit feedback loss term corresponding to the content feedback information of the sample object.

In this embodiment of this application, the target loss function may be a cross-entropy loss function or another type of loss function. Descriptions are made below mainly using a cross-entropy loss function as an example. The following calculation formula is a target loss function L provided by this embodiment of this application:

$$L = -\frac{1}{N}\left(\lambda_c \sum_{S_c}\log p(x) - \lambda_u \sum_{S_u}\log(1-p(x)) - \lambda_d \sum_{S_d}\log(1-p(x))\right);$$

where N is the quantity of training samples; the training samples may be classified into three groups based on user feedback behaviors, the feedback behavior corresponding to the training samples in Sc is click, the feedback behavior corresponding to the training samples in $S_u$ is unclick, and the feedback behavior corresponding to the training samples in $S_d$ is an explicit negative feedback behavior (such as a bad review); and p(x) is a predicted CTR outputted by the prediction model for a training sample x.

In the foregoing calculation formula, the implicit feedback loss term is classified into two an implicit positive feedback loss term $$\sum_{S_c}\log p(x)$$

and an implicit negative feedback loss term $$\sum_{S_c}\log(1-p(x))$$

according to types of the feedback behaviors, that is, click and unclick. The explicit negative feedback loss term is $$\sum_{S_d}\log(1-p(x)).$$

$\lambda_c$, $\lambda_u$, and $\lambda_d$ are weights respectively corresponding to the loss terms. Generally, $\lambda_c=\lambda_u=1$, and $\lambda_d$ is greater than $\lambda_c$ and $\lambda_u$, and is generally 7, 8, or the like.

In this embodiment of this application, when optimizing the target loss function through the optimization algorithm, the prediction model is mainly evaluated according to the predicted CTRs outputted by the prediction model, and $\lambda_u$ is adjusted according to an evaluation result, and the prediction model is then optimized according to the adjusted target loss function, until the prediction model converges and an effect that the difference between the labeled predicted CTR of each training sample and the predicted CTR of each training sample obtained using the untrained prediction model is within an allowable difference range is achieve.

In the design of the loss function for the model, loss terms related to user explicit feedback behaviors are added, so that the explicit feedback information of the user is fully considered when the model ranks candidate sets formed by the content that is to be recommended, thereby obtaining a more accurate ranking result.

In the foregoing implementation, the more training samples used during the model training, the more accurate the model obtained by training. Therefore, on the basis of ensuring the accuracy and the speed of the model training, an appropriate quantity of training samples may be used for training.

S24: Determine, according to the predicted CTR at which the target object clicks each piece of content that is to be recommended, recommended content for the target object from the pieces of content that is to be recommended, and transmit the determined recommended content to a terminal device corresponding to the target object.

In this embodiment of this application, when content recommendation is performed for the target object according to the predicted CTRs, the predicted CTRs of the plurality of pieces of the content that is to be recommended may be ranked. Some content that is to be recommended with rankings in a preset ranking range is recommended to the target object. For example, the top N content that is to be recommended ranked in descending order is selected, or the last N content that is to be recommended ranked in ascending order is selected, where N is a positive integer.

For example, the target object is a user B, there are 10 pieces of content that is to be recommended, and corresponding predicted CTRs are respectively 0.9, 0.3, 0.8, 0.75, 0.65, 0.6, 0.78, 0.05, 0.4, and 0.5.

If N=5, five pieces of content that is to be recommended with the predicted CTRs as 0.9, 0.8, 0.78, 0.75, and 0.65 are respectively recommended to the user B.

Alternatively, M pieces of content that is to be recommended with the predicted CTRs greater than a preset probability threshold are selected and recommended to the target object, where M is a positive integer.

For example, if the preset probability threshold is 0.5, six pieces of content that is to be recommended with the predicted CTRs as 0.9, 0.8, 0.78, 0.75, 0.65, and 0.6 are respectively recommended to the user B.

The methods for recommending content to the target object according to the predicted CTRs listed in the foregoing embodiment are merely used as examples for descriptions. Actually, any method for recommending content according to predicted CTRs is applicable to the embodiments of this application.

In this embodiment of this application, content may be recommended to the target object in the manner of feed stream recommendation. Some selected content that is to be recommended is displayed to the target object using the terminal device, thereby improving the accuracy and CTR of the recommended content.

In this embodiment of this application, during CTR prediction for the content that is to be recommended, in addition to the implicit feedback information of the target object on the recommended content, the explicit feedback information of the target object on the recommended content is also considered, and the explicit feedback information is combined with the implicit feedback information to determine the behavior preference information of the target object through feature interaction. The behavior preference information determined in this way is more accurate and reliable than behavior preference information determined only based on the implicit feedback information of the target object. Based on the behavior preference information obtained in this way, the predicted CTR obtained by combining the content feedback information of the target object and the content feature information of the content that is to be recommended is more accurate than a predicted CTR determined only based on the implicit feedback information in the related technical solutions. Therefore, in a case that each piece of content that is to be recommended is ranked based on the predicted CTR, and content is recommended to the target object according to a ranking result, the recommended content is more in line with the preference of the target object, thereby improving the accuracy of content recommendation, and further improving the CTR at which the target object clicks the recommended content.

The foregoing process of obtaining, based on the machine learning model, the predicted CTR at which the target object clicks the content that is to be recommended is described in detail below with reference to FIG. 5.

Figure 5:
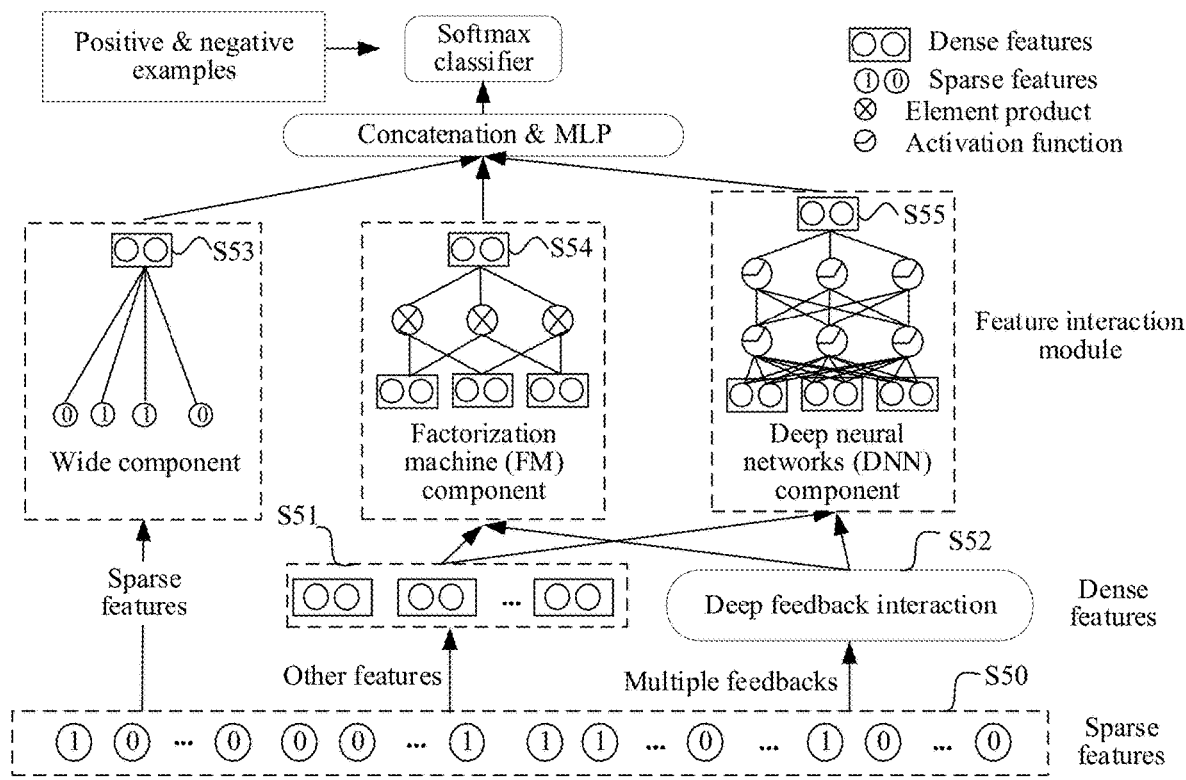
FIG. 5 is a schematic structural diagram of a prediction model according to some embodiments of this application.

FIG. 5 is a schematic structural diagram of a prediction model according to an embodiment of this application. The lowest layer of the prediction model is an input layer, and the information obtained in step S21 may be used as input parameters of the prediction model and inputted into the prediction model for processing. The information obtained in step S21 specifically refers to the content feedback information of the target object and the content feature information of the content that is to be recommended obtained through feature services provided based on a user portrait and a content portrait. The content feedback information of the target object includes at least explicit feedback information and implicit feedback information of the target object on recommended content and object portrait information of the target object, and the content feature information of the content that is to be recommended mainly refers to content portrait information.

In this embodiment of this application, the input parameters are in the form of sparse features, that is, the inputted features are discrete features. Generally, the processing of the discrete features is converting the discrete features into the form of one-hot (one-hot encoding). However, the one-hot type of features inputted into the neural network result in too many network parameters. Therefore, the input parameters of the prediction model in this application are in the form of fields. Features of the same nature are allocated to the same field. For example, the age described above belongs to a field, the gender belongs to a field, the occupation belongs to a field, the author belongs to a field, and the category of the article belongs to a field. In this way, the network parameters can be effectively reduced, the amount of calculation is reduced correspondingly, and the efficiency of the model is improved.

As shown in FIG. 5, the input parameter S50 refers to a plurality of fields corresponding to the content feedback information of the target object and the content feature information of the content that is to be recommended. One or more circles correspond to one field, for example, the user age field may be divided into 5 circles, each circle corresponds to an age range, for example, 1 to 20 years old correspond to a circle, 21 to 40 years old correspond to a circle, 41 to 60 years old correspond to a circle, 61 to 80 years old correspond to a circle, and 81 to 100 years old correspond to a circle. If the target object is 20 years old, numbers in the 5 circles of the corresponding age feature field are 1, 0, 0, 0, and 0, where the number 1 indicates that the age of the target object falls into the age range corresponding to the circle.

Using the gender field as an example, the field may correspond to two circles, one circle represents female, and the other represents male. Similarly, if the target object is female, numbers in the two circles in the field are 1 and 0 respectively. By analogy, the same is true for other feature fields. For example, in the occupation field, different circles may represent different occupation types. In FIG. 5, the sparse features inputted into the input layer are feature information corresponding to a large quantity of fields, and each circle may correspond to a 16-dimensional feature vector, that is, a sparse feature vector corresponding to each field.

In this embodiment of this application, obtaining, according to the content feedback information and the content feature information inputted into the prediction model, the predicted CTR at which the target object clicks the content that is to be recommended mainly includes steps S22 and S23. The performing feature interaction according to the explicit feedback information and the implicit feedback information in the content feedback information, and obtaining behavior preference information of the target object in step S22 is mainly implemented based on a deep feedback interaction component in the prediction model. The performing feature extraction based on the behavior preference information, the content feedback information, and the content feature information, and obtaining a predicted CTR at which the target object clicks the content that is to be recommended in step S23 is mainly implemented based on a wide component, an FM component, and a DNN component in the prediction model. Descriptions are made in detail below with reference to FIG. 5 and FIG. 6.

In this embodiment of this application, the implementation of obtaining the behavior preference information of the target object according to the deep feedback interaction component in the prediction model includes:

respectively inputting the explicit feedback information and the implicit feedback information into the deep feedback interaction component, and obtaining the behavior preference information of the target object outputted by the deep feedback interaction component.

Multiple feedbacks in FIG. 5 are parameters inputted into the deep feedback interaction component, which are the explicit feedback information and the implicit feedback information of the target object in the large quantity of feature information and further include the content feature information of the content that is to be recommended.

The deep feedback interaction shown in FIG. 5 is the deep feedback interaction component of the prediction model, which is mainly used for performing feature interaction on the explicit feedback information and the implicit feedback information to obtain the behavior preference information of the target object.

In some embodiments, the implicit feedback information includes a click history sequence and an unclick history sequence corresponding to the target object, and the explicit feedback information includes an explicit feedback history sequence corresponding to the target object. FIG. 2D shows a specific process of obtaining the behavior preference information of the target object based on the deep feedback interaction. As shown in FIG. 2D, the process includes the following steps:

Step S222: Respectively input the click history sequence, the unclick history sequence, and the explicit feedback history sequence corresponding to the target object into the deep feedback interaction component, and perform encoding and decoding processing on the click history sequence, the unclick history sequence, and the explicit feedback history sequence based on a transformer based on a self-attention mechanism in the deep feedback interaction component to obtain a corresponding high-order click vector, a corresponding high-order unclick vector, and a corresponding explicit feedback high-order vector.

Step S223: Perform feature interaction on the high-order click vector and the unclick history sequence using an attention mechanism, to obtain a first interaction vector corresponding to the target object, and perform feature interaction on the explicit feedback high-order vector and the unclick history sequence to obtain a second interaction vector corresponding to the target object.

Step S224: Concatenate the high-order click vector, the high-order unclick vector, the explicit feedback high-order vector, the first interaction vector, and the second interaction vector to obtain a behavior preference feature vector of the target object, and use the behavior preference feature vector as the behavior preference information of the target object.

In this way, high-order expressions of user behaviors are extracted from the sequences using the transformer, and key useful information is extracted from the unclick history sequence with reference to the click history sequence and the explicit feedback history sequence using the attention mechanism, thereby effectively capturing the current interests of the user, and helping increase the CTR and improve the user experience.

Figure 6:
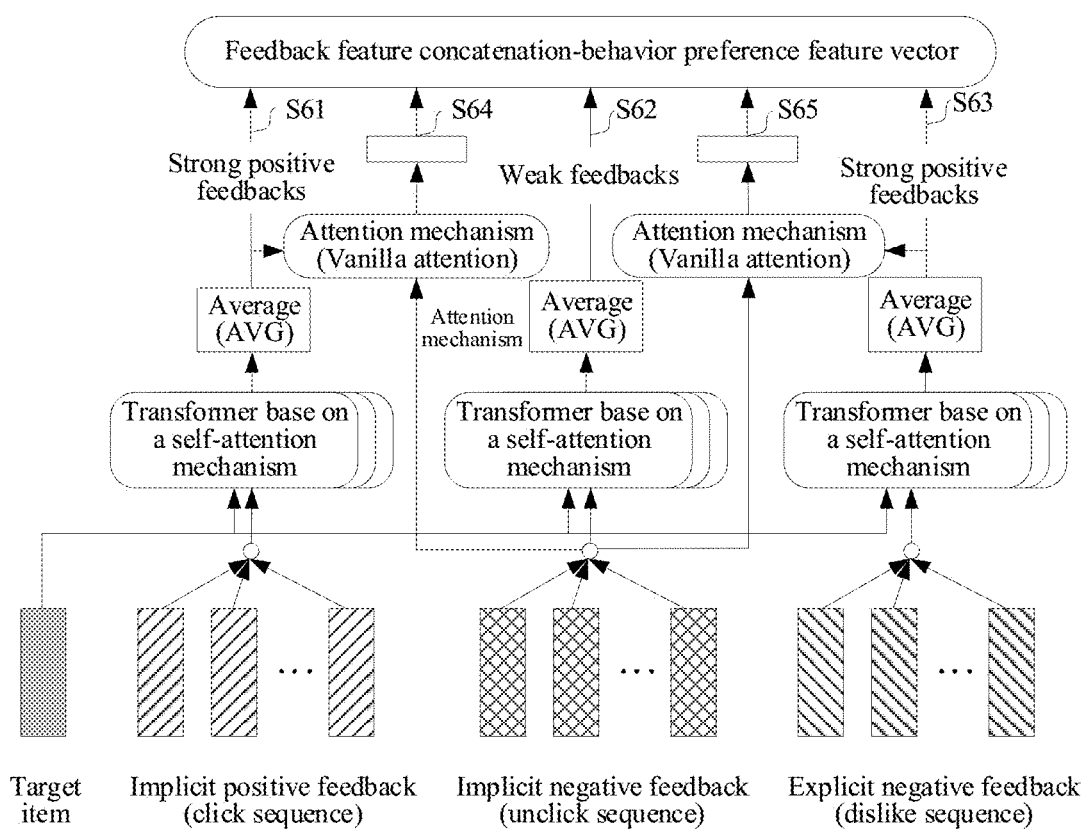
FIG. 6 is a schematic structural diagram of a deep feedback interaction module according to some embodiments of this application.

The process of obtaining the behavior preference information based on the deep feedback interaction is used as an example for descriptions with reference to FIG. 6.

FIG. 6 is a schematic diagram of the internal structure of a deep feedback interaction module according to an embodiment of this application. The internal structure specifically includes two parts: a transformer and a vanilla attention (attention mechanism). In this embodiment of this application, the historical behavior sequences determined according to historical behaviors of the user are modeled using the transformer and the vanilla attention, and the sequences are processed into vectors.

The click history sequence is implicit positive feedback (click sequence) in FIG. 6, the unclick history sequence is implicit negative feedback (unclick sequence) in FIG. 6, and the explicit feedback history sequence may include one or more of an explicit positive feedback history sequence and an explicit negative feedback history sequence. In FIG. 6, explicit negative feedback (dislike sequence) is the explicit negative feedback history sequence.

In FIG. 6, a target item refers to the content feature information of the content that is to be recommended, which is used for generating a high-order vector in combination with the historical behavior sequence. Using an article as an example of the content that is to be recommended, assuming that the content feature information includes four fields, namely article category, article ID, article title, and article author, and each field corresponds to a 16-dimensional feature vector, the target item corresponds to a 64-dimensional high-dimensional feature vector. Similarly, a plurality of rectangular boxes included in each historical behavior sequence in the bottom layer of FIG. 6 correspond to content feature information of a plurality of articles, and one rectangular box refers to the content feature information of one article. The click sequence includes the content feature information of each article clicked by the target object, the unclick sequence includes the content feature information of each article that the target object does not click, and the dislike sequence includes the content feature information of each article that the target object does not like.

In this embodiment of this application, the AVG (average) and the transformer in FIG. 6 may be considered as one part to generate high-order vectors corresponding to the historical behavior sequences.

The specific process of obtaining the behavior preference information of the target object based on the deep feedback interaction includes the following steps:

At first, high-order expressions of the user behaviors are extracted from the historical behavior sequences using the transformer, and high-order vectors corresponding to the historical behavior sequences are generated. Specifically, the target item and the click sequence are inputted into the transformer to obtain the high-order click vector, that is, S61 in FIG. 6, where the vector includes strong positive feedback information. Similarly, the target item and the unclick sequence are inputted into the transformer to obtain the high-order unclick vector, that is, S62 in FIG. 6, where the vector includes weak feedback information. The target item and the dislike sequence are inputted into the transformer to obtain the explicit feedback high-order vector, that is, S63 in FIG. 6, where the vector includes strong positive feedback information.

Further, feature interaction is performed on the high-order click vector and the unclick history sequence through operation of the vanilla attention, to obtain the first interaction vector, that is, S64 in FIG. 6, and feature interaction is performed on the explicit feedback high-order vector and the unclick history sequence through operation of the vanilla attention, to obtain the second interaction vector. In the process, key useful information is extracted from the unclick history sequence with the click history sequence and the explicit feedback history sequence as a reference, to mold for the preference of the user. Specifically, the five high-order vectors S61 to S65 are concatenated to construct the behavior preference feature vector of the user. That is, the behavior preference feature vector of the user is generated through feedback feature concatenation in FIG. 6, to learn what the target object really likes, what the target object really does not like, what the target object sometimes likes, and what the target object sometimes does not like, and so on.

In some embodiments, before the high-order vectors respectively corresponding to the historical behavior sequences are obtained based on the transformer, the time information may be further fused. Specifically, the click history sequence, the unclick history sequence, and the explicit feedback history sequence are respectively fused with the time information.

In this way, when feature interaction is performed on the feedback information based on the deep feedback interaction component, the time information is further considered. The time information is respectively fused with the historical behavior sequences of the user, so that the user behavior preference learned based on the time information is more in line with living habits of the user and is more authentic and reliable, and the predicted CTR obtained based on the above is higher.

The three historical behavior sequences listed in the foregoing embodiment are merely used as examples for descriptions. In this embodiment of this application, other types of user feedback information may be further fused to generate historical behavior sequences for feature interaction to obtain the behavior preference information of the user. For example, an explicit positive feedback behavior sequence generated by clicking, sharing, recommending, and other behavior of the user is fused.

In this embodiment of this application, after the behavior preference information of the target object is obtained based on the deep feedback interaction, the input parameters in the input layer, that is, the content feedback information and the content feature information, may be combined to determine the predicted CTR.

Other features in FIG. 5 are some basic information, specifically including object portrait feature fields (age, gender, occupation, hobbies, and the like) in the content feedback information of the target object and content portrait feature fields (ID, title, category, author, and the like) in the content feature information of the content that is to be recommended.

In some embodiments, before feature extraction is performed on the behavior preference information, the content feedback information, and the content feature information using the trained prediction model, sparse feature vectors respectively corresponding to the object portrait feature fields and the content portrait feature fields further need to be embedded separately, to obtain dense feature vectors respectively corresponding to the object portrait feature fields and the content portrait feature fields, that is, the dashed-line rectangular box shown in S51 in the figure, where each small rectangular box in the rectangular box corresponds to one field.

In this way, dimensionality reduction can be performed on data to reduce the amount of calculation, and only a part of features with the number 1 in a large quantity of features inputted into the bottom layer are extracted for processing and converted into dense feature vectors of the same dimension through embedding.

Next, feature extraction is performed based on the behavior preference information, the content feedback information, and the content feature information to obtain the predicted CTR at which the target object clicks the content that is to be recommended, which is mainly implemented based on a wide component, an FM component, and a DNN component in the prediction model. FIG. 2E shows a specific process of performing feature extraction based on the behavior preference information, the content feedback information, and the content feature information, and obtaining the predicted CTR at which the target object clicks the content that is to be recommended. As shown in FIG. 2E, the process includes the following steps:

Step S232: Learn weight contributions of different feature fields in the object portrait information and the content feature information based on the wide component, and obtain a feature weight vector; perform feature extraction on the behavior preference feature vector and the dense feature vectors based on the FM component, and obtain a low-order interaction feature vector corresponding to the target object; perform feature extraction on the behavior preference feature vector and the dense feature vectors based on the DNN component, and obtain a high-order interaction feature vector corresponding to the target object.

Step S233: Concatenate the feature weight vector, the low-order interaction feature vector, and the high-order interaction feature vector to a fully-connected layer, and determine the predicted CTR at which the target object clicks the content that is to be recommended through weighted summation.

The behavior preference feature vector is S52. For FM component and DNN component, the inputted features are the same, which are the dense feature vectors S51 and the behavior preference feature vector S52.

In FIG. 5, Concatenation & MLP is used for full connection and weighted summation. After the feature weight vector S53, the low-order interaction feature vector S54, and the high-order interaction feature vector S55 are concatenated to the fully-connected layer, weighted summation is performed, and finally the predicted CTR is obtained through Softmax (classification).

In this way, the CTR at which the user clicks the content that is to be recommended is predicted based on the user behavior preference information obtained through various feedback information, the user portrait, and the content portrait, which fully considers the impact of user behavior feedback on the CTR of the user. Therefore, CTR prediction may be performed for articles, videos, and pieces of news based on the prediction model, and the content is ranked according to CTRs. Finally, the content with a higher CTR is recommended to the user to increase the CTR of the user.

In some embodiments, the performing feature extraction on the behavior preference feature vector and the dense feature vectors based on the FM component, and obtain a low-order interaction feature vector corresponding to the target object further includes:

respectively inputting the dense feature vectors and the behavior preference feature vector into the FM component, and extracting an interaction result between any two feature vectors in the dense feature vectors and the behavior preference feature vector using Hadamard product; and generating the low-order interaction feature vector based on the interaction result between different feature vectors.

As shown in FIG. 5, the FM component extracts the interaction result between different fields using the Hadamard product. Accordingly, some original features are retained, and the accuracy of the model is improved.

Figure 7:
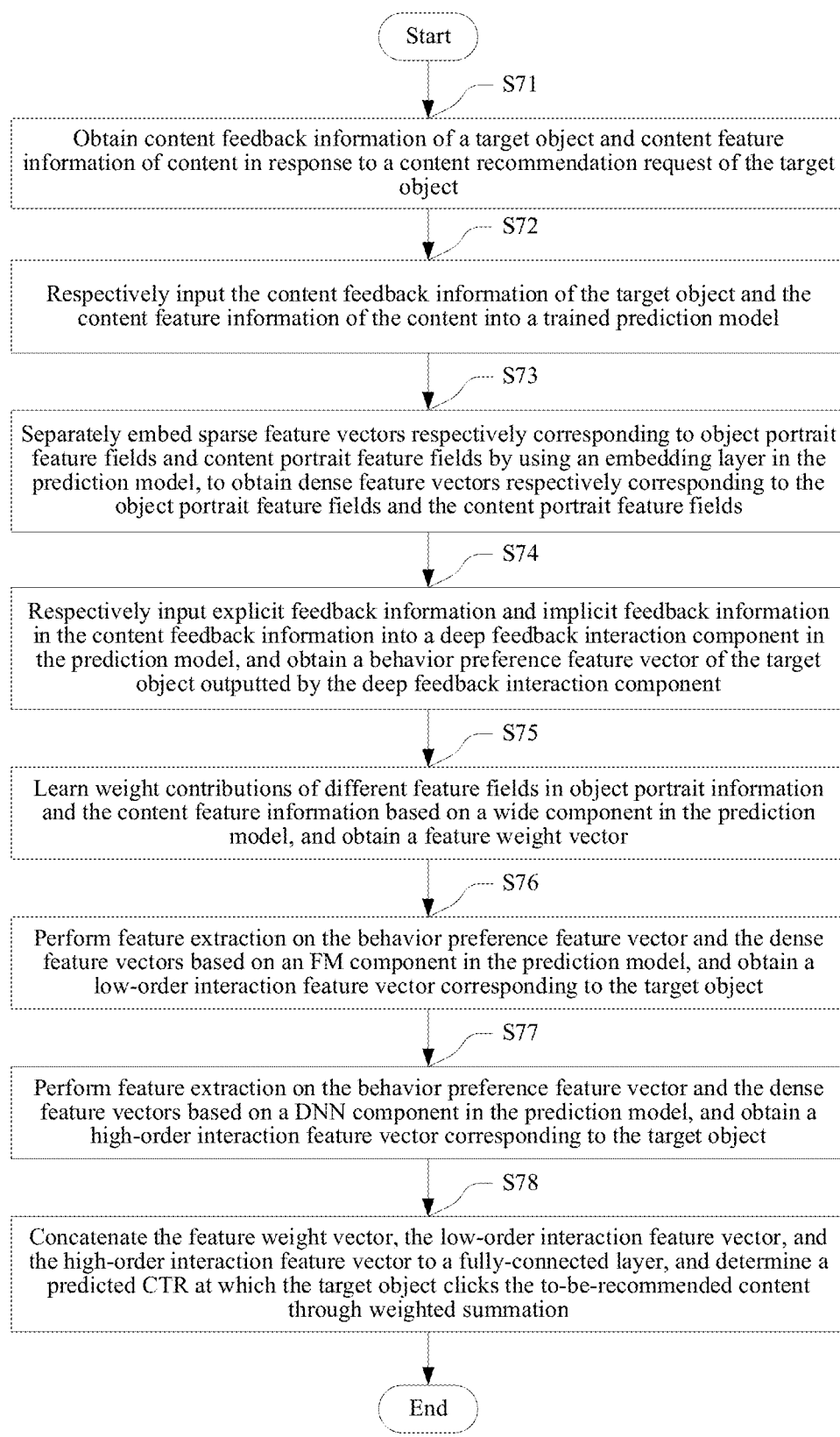
FIG. 7 is a schematic flowchart of a complete content recommendation method according to some embodiments of this application.

FIG. 7 is a complete flowchart sequence diagram of content recommendation. A specific implementing process of the method is as follows:

Step S71: Obtain content feedback information of a target object and content feature information of content that is to be recommended in response to a content recommendation request of the target object.

Step S72: Respectively input the content feedback information of the target object and the content feature information of the content that is to be recommended into a trained prediction model.

Step S73: Separately embed sparse feature vectors respectively corresponding to the object portrait feature fields and the content portrait feature fields using an embedding layer in the prediction model, to obtain dense feature vectors respectively corresponding to the object portrait feature fields and the content portrait feature fields.

Step S74: Respectively input explicit feedback information and implicit feedback information in the content feedback information into a deep feedback interaction component in the prediction model, and obtain a behavior preference feature vector of the target object outputted by the deep feedback interaction component.

Step S75: Learn weight contributions of different feature fields in object portrait information and the content feature information based on a wide component in the prediction model, and obtain a feature weight vector.

Step S76: Perform feature extraction on the behavior preference feature vector and the dense feature vectors based on an FM component in the prediction model, and obtain a low-order interaction feature vector corresponding to the target object.

Step S77: Perform feature extraction on the behavior preference feature vector and the dense feature vectors based on a DNN component in the prediction model, and obtain a high-order interaction feature vector corresponding to the target object.

Step S78: Concatenate the feature weight vector, the low-order interaction feature vector, and the high-order interaction feature vector to a fully-connected layer, and determine a predicted CTR at which the target object clicks the content that is to be recommended through weighted summation.

Steps S75, S76, and S77 may be concurrently performed steps.

Through offline testing of the prediction model provided in the embodiments of this application, after the model is launched, compared with a CTR prediction model in the related art, the CTR of the exposed content of a specific application is increased by 3.6%, and the per capita playback time is increased by 1.98%, where the page view (PV) and the visit view (VV) are increased by 2.38%, and the content negative feedback rate is decreased by 12%. Obviously, the model can better capture user interests, improve the accuracy of content recommendation, and improve user experience.

The PV refers to the quantity of page views or clicks, which is accumulated views when the same page is viewed for a plurality of times. The VV refers to the counted quantity of views to a website in a day. 1 view is counted after the browsing is completed and all pages are closed. For example, if a browser is opened at 10 o'clock, and 3 pages are viewed, and the browser is opened again at 11 o'clock, and 2 pages are viewed, the PV increases by 5, and the VV increases by 2.

Figure 8:
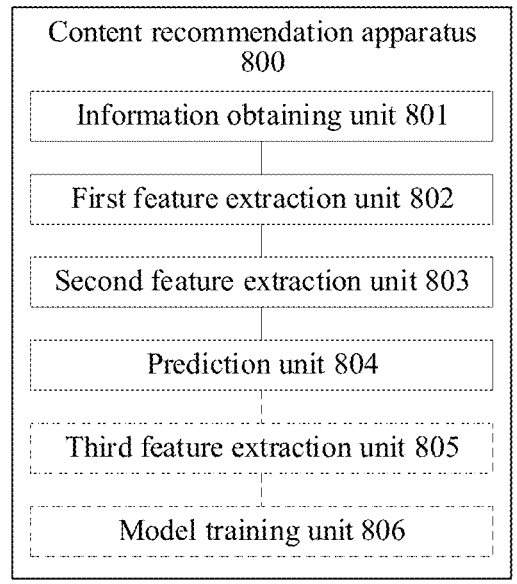
FIG. 8 is a schematic structural diagram of compositions of a content recommendation apparatus according to some embodiments of this application.

FIG. 8 is a schematic structural diagram of a content recommendation apparatus 800, the apparatus including:

an information obtaining unit 801, configured to obtain content feedback information of a target object and content feature information of content that is to be recommended in response to a content recommendation request of the target object, the content feedback information including at least explicit feedback information and implicit feedback information of the target object on recommended content and object portrait information of the target object;

a first feature extraction unit 802, configured to perform feature interaction according to the explicit feedback information and the implicit feedback information in the content feedback information, and obtain behavior preference information of the target object;

a second feature extraction unit 803, configured to perform feature extraction based on the behavior preference information, the content feedback information, and the content feature information, and obtain a CTR at which the target object clicks the content that is to be recommended; and a prediction unit 804, configured to determine, according to the predicted CTR at which the target object clicks each piece of content that is to be recommended, recommended content for the target object from the pieces of content that is to be recommended, and transmit the determined recommended content to a terminal device corresponding to the target object.

In some embodiments, the first feature extraction unit 802 is specifically configured to:

respectively input the content feedback information of the target object and the content feature information of the content that is to be recommended into a trained prediction model, perform feature interaction on the explicit feedback information and the implicit feedback information in the content feedback information using the trained prediction model, and obtain the behavior preference information of the target object.

The second feature extraction unit 803 is specifically configured to:

perform feature extraction on the behavior preference information, the content feedback information, and the content feature information using the trained prediction model, and obtain the predicted CTR that is outputted by the prediction model and at which the target object clicks the content that is to be recommended.

The trained prediction model is trained according to a training sample data set labeled with predicted CTRs, and a training sample in the training sample data set includes content feedback information of a sample object and content feature information of sample content.

In some embodiments, the prediction model includes a deep feedback interaction component, and the first feature extraction unit 802 is specifically configured to:

respectively input the explicit feedback information and the implicit feedback information into the deep feedback interaction component, and obtain the behavior preference information of the target object outputted by the deep feedback interaction component.

In some embodiments, the implicit feedback information includes a click history sequence and an unclick history sequence corresponding to the target object, and the explicit feedback information includes an explicit feedback history sequence corresponding to the target object; and the first feature extraction unit 802 is specifically configured to:

respectively input the click history sequence, the unclick history sequence, and the explicit feedback history sequence corresponding to the target object into the deep feedback interaction component, and perform encoding and decoding processing on the click history sequence, the unclick history sequence, and the explicit feedback history sequence based on a transformer based on a self-attention mechanism in the deep feedback interaction component to obtain a corresponding high-order click vector, a corresponding high-order unclick vector, and a corresponding explicit feedback high-order vector;

perform feature interaction on the high-order click vector and the unclick history sequence using an attention mechanism, to obtain a first interaction vector corresponding to the target object, and perform feature interaction on the explicit feedback high-order vector and the unclick history sequence to obtain a second interaction vector corresponding to the target object; and concatenate the high-order click vector, the high-order unclick vector, the explicit feedback high-order vector, the first interaction vector, and the second interaction vector to obtain a behavior preference feature vector of the target object, and use the behavior preference feature vector as the behavior preference information of the target object.

In some embodiments, the first feature extraction unit 802 is further configured to:

before encoding and decoding processing is performed on the click history sequence, the unclick history sequence, and the explicit feedback history sequence based on a transformer based on a self-attention mechanism in the deep feedback interaction component to obtain a corresponding high-order click vector, a corresponding high-order unclick vector, and a corresponding explicit feedback high-order vector, respectively fuse the click history sequence, the unclick history sequence, and the explicit feedback history sequence with time information.

In some embodiments, the object portrait information includes a plurality of object portrait feature fields of the target object, and the content feature information includes a plurality of content portrait feature fields of the content that is to be recommended; and the apparatus further includes:

a third feature extraction unit 805, configured to separately embed sparse feature vectors respectively corresponding to the object portrait feature fields and the content portrait feature fields before the second feature extraction unit 803 performs feature extraction on the behavior preference information, the content feedback information, and the content feature information using the trained prediction model, to obtain dense feature vectors respectively corresponding to the object portrait feature fields and the content portrait feature fields.

In some embodiments, the prediction model further includes a wide component, an FM component, and a DNN component, and the behavior preference information of the target object is a behavior preference feature vector; and the second feature extraction unit 803 is specifically configured to:

learn weight contributions of different feature fields in the object portrait information and the content feature information based on the wide component, and obtain a feature weight vector; perform feature extraction on the behavior preference feature vector and the dense feature vectors based on the FM component, and obtain a low-order interaction feature vector corresponding to the target object; perform feature extraction on the behavior preference feature vector and the dense feature vectors based on the DNN component, and obtain a high-order interaction feature vector corresponding to the target object; and concatenate the feature weight vector, the low-order interaction feature vector, and the high-order interaction feature vector to a fully-connected layer, and determine the predicted CTR at which the target object clicks the content that is to be recommended through weighted summation.

In some embodiments, the second feature extraction unit 803 is specifically configured to:

respectively input the dense feature vectors and the behavior preference feature vector into the FM component, and extract an interaction result between any two feature vectors in the dense feature vectors and the behavior preference feature vector using Hadamard product; and generate the low-order interaction feature vector based on the interaction result between different feature vectors.

In some embodiments, the apparatus further includes a model training unit 806; and the model training unit 806 is configured to obtain the trained prediction model in the following manner:

selecting training samples from the training sample data set, each of the training samples being labeled with a predicted CTR at which a sample object clicks sample content;

for any training sample, inputting content feedback information of a sample object and content feature information of sample content included in the training sample into an untrained prediction model, and obtaining a predicted CTR that is outputted by the untrained prediction model and at which the sample object clicks the sample content; and optimizing a parameter of the untrained prediction model based on a target loss function, until a difference between the labeled predicted CTR of each training sample and the predicted CTR of each training sample obtained using the untrained prediction model is within an allowable difference range, to obtain the trained prediction model.

In some embodiments, the target loss function includes an explicit feedback loss term and an implicit feedback loss term corresponding to the content feedback information of the sample object.

For ease of description, the foregoing components are respectively described as various modules (or units) divided according to functions. Certainly, during the implementation of this application, functions of the various modules (or units) may be implemented in the same piece of or a plurality of pieces of software or hardware.

A person skilled in the art can understand that various aspects of this application may be implemented as systems, methods, or computer program products. Therefore, each aspect of this application may be specifically implemented in the following forms, that is, the implementation form of complete hardware, complete software (including firmware and micro code), or a combination of hardware and software, which may be uniformly referred to as "circuit", "module", or "system" herein.

Figure 9:
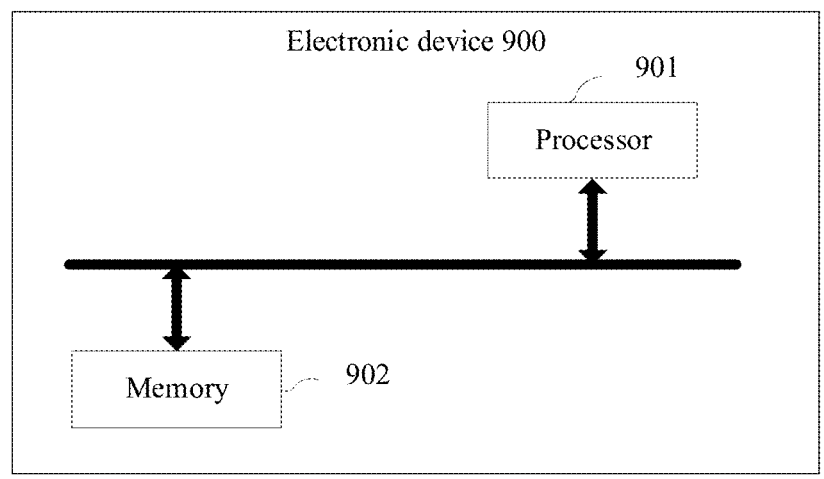
FIG. 9 is a schematic structural diagram of compositions of an electronic device according to some embodiments of this application.

Some embodiments of this application further provide an electronic device. Referring to FIG. 9, the electronic device 900 may include at least one processor 901 and at least one memory 902. The memory 902 stores program code, the program code, when executed by the processor 901, causing the processor 901 to perform the steps in the foregoing described content recommendation method according to various exemplary implementations of this application in this specification. For example, the processor 901 may perform the steps shown in FIG. 2A.

Some embodiments of this application further provide a computing apparatus. The computing apparatus may include at least one processing unit and at least one storage unit. The storage unit stores program code, the program code, when executed by the processing unit, causing the processing unit to perform the steps in the foregoing described content recommendation method according to various exemplary implementations of this application in this specification. For example, the processing unit may perform the steps shown in FIG. 2A.

A computing apparatus 100 according to this implementation of this application is described below with reference to FIG. 10. The computing apparatus 100 shown in FIG. 10 is only an example, and does not impose any restriction on functions and scopes of use of the embodiments of this application.

Figure 10:
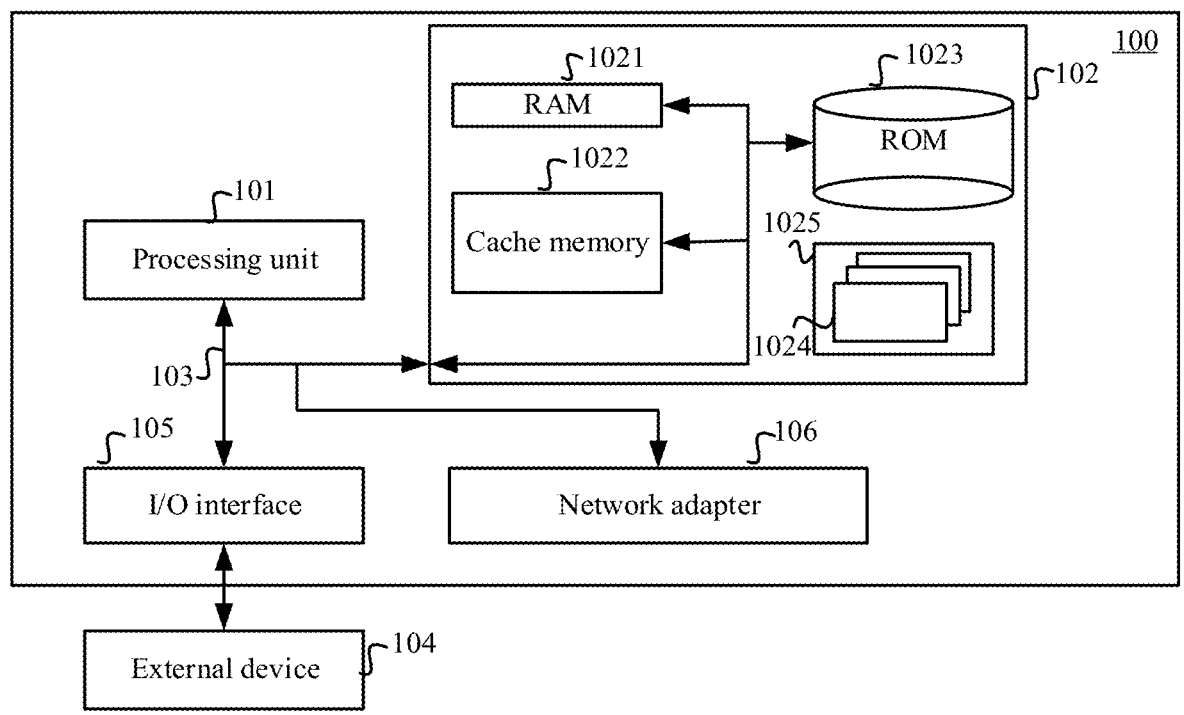
FIG. 10 is a schematic structural diagram of compositions of hardware of a computing apparatus according to some embodiments of this application.

As shown in FIG. 10, the computing apparatus 100 is shown in the form of a general computing apparatus. Components of the computing apparatus 100 may include, but are not limited to, the at least one processing unit 101, the at least one storage unit 102, and a bus 103 connected to different system components (including the storage unit 102 and the processing unit 101).

The bus 103 represents one or more of several types of bus structures, including a memory bus or a memory controller, a peripheral bus, a processor, or a local bus using any bus structure among various bus structures.

The storage unit 102 may include a readable medium in the form of a volatile memory, such as a random access memory (RAM) 1021 and/or a cache storage unit 1022, and may further include a read-only memory (ROM) 1023.

The storage unit 102 may further include a program/utility tool 1025 having a group of (at least one) program modules 1024. Such a program module 1024 includes, but is not limited to, an operating system, one or more application programs, other program modules, and program data. Each or a combination of these examples may include implementation of a network environment.

The computing apparatus 100 may further communicate with one or more external devices 104 (such as a keyboard, a pointing device), and may further communicate with one or more devices that enable a user to interact with the computing apparatus 100, and/or any device (such as a network card or a modem) that enables the computing apparatus 100 to communicate with one or more other computing apparatuses. Such communication may be performed using an input/output (I/O) interface 105. In addition, the computing apparatus 100 may further communicate with one or more networks, such as a local area network (LAN), a wide area network (WAN), and/or a public network, (such as the Internet) using a network adapter 106. As shown in the figure, the network adapter 106 communicates with other modules configured to the computing apparatus 100 using the bus 103. It is to be understood that, although not shown in the figure, other hardware and/or software modules may be used in combination with the computing apparatus 100, including, but not limited to: micro code, a device driver, a redundancy processor, an external disk drive array, a RAID system, a tape drive, a data backup storage system, and the like.

In some embodiments, each aspect of the content recommendation method provided in this application may be further implemented in the form of a program product including program code. When the program product runs on a computer device, the program code is used to enable the computer device to perform steps of the content recommendation method according to various exemplary implementations of this application described above in this specification. For example, the computer device can perform the steps such as the ones shown in FIG. 2A.

According to the foregoing descriptions of the implementations, a person skilled in the art may readily understand that the exemplary implementations and the modules and units described herein may be implemented by using software, or may be implemented by combining software and necessary hardware. Therefore, the technical solutions of the embodiments and the modules and units thereof of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments, and the modules and units thereof, of this application.

The program product may use any combination of one or more readable media. The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More specific examples (a non-exhaustive list) of the readable storage medium may include: an electrical connection having one or more wires, a portable disk, a hard disk, a RAM, a ROM, an erasable programmable ROM (EPROM or flash memory), an optical fiber, a portable CD-ROM, an optical storage device, a magnetic storage device, or any appropriate combination thereof.

Although preferred embodiments of this application have been described, once a person skilled in the art learns of the basic creative concept, additional changes and modifications may be made to the embodiments. Therefore, the following claims are intended to be construed as to cover the exemplary embodiments and all changes and modifications falling within the scope of this application.

Certainly, a person skilled in the art can make various modifications and variations to this application without departing from the spirit and scope of this application. In this case, if the modifications and variations made to this application fall within the scope of the claims of this application and their equivalent technologies, this application is intended to include these modifications and variations.

What is claimed is:

1. A content recommendation method, performed by an electronic device, the method comprising:
   obtaining content feedback information of a target object and content feature information of content that is to be recommended in response to a content recommendation request of the target object, the content feedback information comprising at least explicit feedback information and implicit feedback information of the target object on recommended content and object portrait information of the target object;
   respectively inputting the explicit feedback information and the implicit feedback information into a trained prediction model including a deep feedback interaction component, and obtaining behavior preference information of the target object outputted by the deep feedback interaction component;
   performing feature extraction on the behavior preference information, the content feedback information, and the content feature information using the trained prediction model, and obtaining a predicted click-through-rate (CTR) that is outputted by the prediction model and at which the target object clicks on the content that is to be recommended; and determining, according to the predicted CTR, recommended content from the pieces of content that is to be recommended, and transmitting the recommended content to a terminal device corresponding to the target object.

2. The method according to claim 1, wherein
the trained prediction model is trained according to a training sample data set labeled with predicted CTRs, and a training sample in the training sample data set comprising content feedback information of a sample object and content feature information of sample content.

3. The method according to claim 2, wherein the implicit feedback information comprises a click history sequence and an unclick history sequence corresponding to the target object, and the explicit feedback information comprises an explicit feedback history sequence corresponding to the target object; and the respectively inputting the explicit feedback information and the implicit feedback information into the deep feedback interaction component, and obtaining the behavior preference information of the target object outputted by the deep feedback interaction component further comprises:

respectively inputting the click history sequence, the unclick history sequence, and the explicit feedback history sequence corresponding to the target object into the deep feedback interaction component, and performing encoding and decoding processing on the click history sequence, the unclick history sequence, and the explicit feedback history sequence based on a transformer based on a self-attention mechanism in the deep feedback interaction component to obtain a corresponding high-order click vector, a corresponding high-order unclick vector, and a corresponding explicit feedback high-order vector;

performing feature interaction on the high-order click vector and the unclick history sequence using an attention mechanism, to obtain a first interaction vector corresponding to the target object, and performing feature interaction on the explicit feedback high-order vector and the unclick history sequence to obtain a second interaction vector corresponding to the target object; and concatenating the high-order click vector, the high-order unclick vector, the explicit feedback high-order vector, the first interaction vector, and the second interaction vector to obtain a behavior preference feature vector of the target object, and using the behavior preference feature vector as the behavior preference information of the target object.

4. The method according to claim 3, wherein before the performing encoding and decoding processing on the click history sequence, the unclick history sequence, and the explicit feedback history sequence based on a transformer based on a self-attention mechanism in the deep feedback interaction component to obtain a corresponding high-order click vector, a corresponding high-order unclick vector, and a corresponding explicit feedback high-order vector, the method further comprises:

respectively fusing the click history sequence, the unclick history sequence, and the explicit feedback history sequence with time information.

5. The method according to claim 2, wherein the object portrait information comprises a plurality of object portrait feature fields of the target object, and the content feature information comprises a plurality of content portrait feature fields of the content that is to be recommended; and before the performing feature extraction on the behavior preference information, the content feedback information, and the content feature information using the trained prediction model, the method further comprises:

separately embedding sparse feature vectors respectively corresponding to the object portrait feature fields and the content portrait feature fields to obtain dense feature vectors respectively corresponding to the object portrait feature fields and the content portrait feature fields.

6. The method according to claim 5, wherein the prediction model further comprises a wide component, a factorization machine (FM) component, and a deep neural networks (DNN) component, and the behavior preference information of the target object is a behavior preference feature vector; and the performing feature extraction on the behavior preference information, the content feedback information, and the content feature information using the trained prediction model, and obtaining the predicted CTR that is outputted by the prediction model and at which the target object clicks the content that is to be recommended further comprises:

learning weight contributions of different feature fields in the object portrait information and the content feature information based on the wide component, and obtaining a feature weight vector;

performing feature extraction on the behavior preference feature vector and the dense feature vectors based on the FM component, and obtaining a low-order interaction feature vector corresponding to the target object;

performing feature extraction on the behavior preference feature vector and the dense feature vectors based on the DNN component, and obtaining a high-order interaction feature vector corresponding to the target object; and concatenating the feature weight vector, the low-order interaction feature vector, and the high-order interaction feature vector to a fully-connected layer, and determining the predicted CTR at which the target object clicks the content that is to be recommended through weighted summation.

7. The method according to claim 6, wherein the performing feature extraction on the behavior preference feature vector and the dense feature vectors based on the FM component, and obtaining a low-order interaction feature vector corresponding to the target object further comprises:

respectively inputting the dense feature vectors and the behavior preference feature vector into the FM component, and extracting an interaction result between any two feature vectors in the dense feature vectors and the behavior preference feature vector using Hadamard product; and generating the low-order interaction feature vector based on the interaction result between different feature vectors.

8. The method according to claim 2, wherein the trained prediction model is trained in the following manner:

selecting training samples from the training sample data set, each of the training samples being labeled with a predicted CTR at which a sample object clicks sample content;

for any training sample, inputting content feedback information of a sample object and content feature information of sample content comprised in the training sample into an untrained prediction model, and obtaining a predicted CTR that is outputted by the untrained prediction model and at which the sample object clicks the sample content; and optimizing a parameter of the untrained prediction model based on a target loss function, until a difference between the labeled predicted CTR of each training sample and the predicted CTR of each training sample obtained using the untrained prediction model is within an allowable difference range, to obtain the trained prediction model.

9. The method according to claim 8, wherein the target loss function comprises an explicit feedback loss term and an implicit feedback loss term corresponding to the content feedback information of the sample object.

10. A content recommendation apparatus, comprising: a processor and a memory, the memory storing program code, wherein when executing the program code, the processor is configured to:

obtain content feedback information of a target object and content feature information of content that is to be recommended in response to a content recommendation request of the target object, the content feedback information comprising at least explicit feedback information and implicit feedback information of the target object on recommended content and object portrait information of the target object;

respectively input the explicit feedback information and the implicit feedback information into a trained prediction model including a deep feedback interaction component, and obtain behavior preference information of the target object outputted by the deep feedback interaction component;

perform feature extraction on the behavior preference information, the content feedback information, and the content feature information using the trained prediction model, and obtain a predicted click-through-rate (CTR) that is outputted by the prediction model and at which the target object clicks on the content that is to be recommended; and determine, according to the predicted CTR at which the target object clicks each piece of content that is to be recommended, recommended content for the target object from the pieces of content that is to be recommended, and transmit the determined recommended content to a terminal device corresponding to the target object.

11. The apparatus according to claim 10, wherein
the trained prediction model is trained according to a training sample data set labeled with predicted CTRs, and a training sample in the training sample data set comprises content feedback information of a sample object and content feature information of sample content.

12. A non-transitory computer-readable storage medium, comprising program code, when the program code runs on an electronic device, the program code causing the electronic device to perform:

obtaining content feedback information of a target object and content feature information of content that is to be recommended in response to a content recommendation request of the target object, the content feedback information comprising at least explicit feedback information and implicit feedback information of the target object on recommended content and object portrait information of the target object;

respectively inputting the explicit feedback information and the implicit feedback information into a trained prediction model including a deep feedback interaction component, and obtaining behavior preference information of the target object outputted by the deep feedback interaction component;

performing feature extraction on the behavior preference information, the content feedback information, and the content feature information using the trained prediction model, and obtaining a predicted click-through-rate (CTR) that is outputted by the prediction model and at which the target object clicks on the content that is to be recommended; and determining, according to the predicted CTR, recommended content from the pieces of content that is to be recommended, and transmitting the recommended content to a terminal device corresponding to the target object.

13. The computer-readable storage medium according to claim 12,
the trained prediction model is trained according to a training sample data set labeled with predicted CTRs, and a training sample in the training sample data set comprising content feedback information of a sample object and content feature information of sample content.

14. The computer-readable storage medium according to claim 13, wherein the implicit feedback information comprises a click history sequence and an unclick history sequence corresponding to the target object, and the explicit feedback information comprises an explicit feedback history sequence corresponding to the target object; and the respectively inputting the explicit feedback information and the implicit feedback information into the deep feedback interaction component, and obtaining the behavior preference information of the target object outputted by the deep feedback interaction component further comprises:

respectively inputting the click history sequence, the unclick history sequence, and the explicit feedback history sequence corresponding to the target object into the deep feedback interaction component, and performing encoding and decoding processing on the click history sequence, the unclick history sequence, and the explicit feedback history sequence based on a transformer based on a self-attention mechanism in the deep feedback interaction component to obtain a corresponding high-order click vector, a corresponding high-order unclick vector, and a corresponding explicit feedback high-order vector;

performing feature interaction on the high-order click vector and the unclick history sequence using an attention mechanism, to obtain a first interaction vector corresponding to the target object, and performing feature interaction on the explicit feedback high-order vector and the unclick history sequence to obtain a second interaction vector corresponding to the target object; and concatenating the high-order click vector, the high-order unclick vector, the explicit feedback high-order vector, the first interaction vector, and the second interaction vector to obtain a behavior preference feature vector of the target object, and using the behavior preference feature vector as the behavior preference information of the target object.

15. The computer-readable storage medium according to claim 14, wherein before the performing encoding and decoding processing on the click history sequence, the unclick history sequence, and the explicit feedback history sequence based on a transformer based on a self-attention mechanism in the deep feedback interaction component to obtain a corresponding high-order click vector, a corresponding high-order unclick vector, and a corresponding explicit feedback high-order vector, the program code further causes the electronic device to perform:

respectively fusing the click history sequence, the unclick history sequence, and the explicit feedback history sequence with time information.

16. The computer-readable storage medium according to claim 13, wherein the object portrait information comprises a plurality of object portrait feature fields of the target object, and the content feature information comprises a plurality of content portrait feature fields of the content that is to be recommended; and before the performing feature extraction on the behavior preference information, the content feedback information, and the content feature information using the trained prediction model, the method further comprises:

separately embedding sparse feature vectors respectively corresponding to the object portrait feature fields and the content portrait feature fields to obtain dense feature vectors respectively corresponding to the object portrait feature fields and the content portrait feature fields.

17. The computer-readable storage medium according to claim 16, wherein the prediction model further comprises a wide component, a factorization machine (FM) component, and a deep neural networks (DNN) component, and the behavior preference information of the target object is a behavior preference feature vector; and the performing feature extraction on the behavior preference information, the content feedback information, and the content feature information using the trained prediction model, and obtaining the predicted CTR that is outputted by the prediction model and at which the target object clicks the content that is to be recommended further comprises:

learning weight contributions of different feature fields in the object portrait information and the content feature information based on the wide component, and obtaining a feature weight vector;

performing feature extraction on the behavior preference feature vector and the dense feature vectors based on the FM component, and obtaining a low-order interaction feature vector corresponding to the target object;

performing feature extraction on the behavior preference feature vector and the dense feature vectors based on the DNN component, and obtaining a high-order interaction feature vector corresponding to the target object; and concatenating the feature weight vector, the low-order interaction feature vector, and the high-order interaction feature vector to a fully-connected layer, and determining the predicted CTR at which the target object clicks the content that is to be recommended through weighted summation.

* * * * *